United States Patent [19]

Lins et al.

[11] 3,768,095

[45] Oct. 23, 1973

[54] MAGNETORESISTIVE KEYBOARD

[75] Inventors: Stanley J. Lins, Minneapolis; David G. Hanson, Coon Rapids, both of Minn.

[73] Assignee: Sperry Rand Corporation, New York, N.Y.

[22] Filed: Sept. 11, 1972

[21] Appl. No.: 287,939

[52] U.S. Cl. ............. 340/365 L, 197/98, 338/32 H, 323/94 H

[51] Int. Cl. ............................................. G06f 3/02

[58] Field of Search ............... 340/365 L; 338/32 H; 323/94 H; 317/235 H; 197/98

[56] References Cited

UNITED STATES PATENTS

| | | | |
|---|---|---|---|
| 3,657,686 | 4/1972 | Masuda et al. | 340/365 L |
| 3,680,026 | 7/1972 | Masuda et al. | 340/365 L |

*Primary Examiner*—John W. Caldwell
*Assistant Examiner*—Robert J. Mooney
*Attorney*—Thomas J. Nikolai et al.

[57] ABSTRACT

A keyboard comprising a matrix of rows and columns of key positions. A first plurality of N parallel strips of magnetoresistive material are formed in a horizontal direction on a glass substrate. A plurality of magnets are arranged side-by-side in a first position over said strips and can selectively be moved to a second position close to said strips so that the magnetic field therefrom passes through said strips. Portions of preselected strips under each magnet are caused to have a narrowed configuration so as to form resistors whose value will change as the associated magnet is moved to its second position. Owing to a resultant change in the magnetic field through the strips, pulses will be generated in an electrical current which is always flowing through each strip. Such pulses form a coded binary output which is sensed by suitable sensing means. Only one sensing means is required for each strip and represents a particular binary bit position. The binary bit positions represented by all N strips form a binary coded word. In a similar manner other pluralities of N magnetoresistive strips are also formed horizontally on said substrate with other pluralities of magnets being positioned thereover. Those strips in each plurality of strips which represent corresponding bit positions are all connected to the same sensing means. Consequently the corresponding bit positions under all of the magnets are connected to the same sensing means and only N sensing means are required for the entire system.

9 Claims, 9 Drawing Figures

MAGNETORESISTIVE KEYBOARD

BACKGROUND OF THE INVENTION

This invention relates generally to manually operated keyboards constructed to produce binary coded outputs and more particularly to a keyboard which employs the variable resistance characteristic of magnetoresistive material when placed in a magnetic field to produce such binary coded output signals.

There are in the prior art many keyboards which will produce coded electrical output signals. Some of these prior art devices employ photoelectric effects. More specifically when a given key is depressed, a bar with coded slots therein is caused to pass a certain pattern of light beams from light sources upon a battery of photoelectric cells to create a predetermined pattern of electrical signals indicative of the depressed key. Other prior art devices function to produce a pattern of electrical signals within the keyboard, with the pattern of signals generated by each key requiring a separate means of amplification which is individual and exclusive to the particular key being depressed.

In both general types of keyboards set forth above the manufacturing cost is relatively high. Further, due to the relative complexity of the structures, problems of reliability are present. More specifically in the keyboards employing moving bars with coded slots therein, the problem of reliability arises due to the relatively large mass of the coded bars and also the wear on such moving parts over an extended period of time. A requirement for separate sensing and amplifying means at each key position produces problems of signal uniformity as well as increased possibility of component failure.

It is a primary object of the invention to provide a simple, reliable and inexpensive keyboard.

A second purpose of the invention is to provide a solid state keyboard of simple and inexpensive design.

A third aim of the invention is a keyboard employing a thin film of magnetoresistive material formed upon a glass substrate and from which both resistive elements and interconnects are formed, thus providing both high reliability and low cost fabrication.

A fourth object of the invention is a simple and reliable keyboard which produces direct encoding at each key position.

A fifth object of the invention is the improvement of keyboards generally.

SUMMARY OF THE INVENTION

In accordance with the invention there is provided a substrate such as glass, upon which is formed a plurality of high resistive elements and a plurality of very low resistive elements arranged in a matrix to form a plurality of N rows and M columns of said resistive elements. All of the high and the low resistive elements in each row are connected together in serial manner by interconnects and then connected in series with a sense amplifier individual to that row. Both the resistive elements and the interconnects are formed from the same film of magnetoresistive material coated upon said glass substrate, with narrow lines of said magnetoresistive material forming the higher valued resistors and wider lines forming both the low resistive elements and also the interconnects.

A first row of M keys are positioned over said matrix so that each key is positioned over a column of resistive elements. Attached to the bottom of each key is a magnet which is lowered upon the column of resistive elements when the key is depressed, to thereby establish a magnetic field through the resistive elements in said row; said magnetic field being perpendicular to a current which flows through said resistive elements at all times. Such magnetic field functions to increase the value of said resistive elements to create a pulsation in the current during such change, i.e., as the key is being depressed to cause the increase in resistance of the resistive element positioned there below. The sensing means associated with each row detects such signal pulsations to produce an output signal consisting of a plurality of pulses in parallel and coded in accordance with the pattern of resistive elements lying under the depressed key.

Additional pluralities of N rows of high and low resistive elements can be added to the system, with each row of resistive elements in each additional plurality of rows being connected in series with the sensing element which is connected to the corresponding row of said first plurality of rows of resistive elements. Thus each sensing means is common to corresponding rows of each plurality of rows of resistive elements so that a total of only N sensing means are required for the system, where N is the number of resistive elements lying under each depressed key.

In accordance with the feature of the invention a keeper sheet of magnetic material is provided to provide a magnetic path for the magnets attached to the keys when said keys are in a non-depressed condition, thereby preventing any appreciable stray magnetic field from passing through said resistive elements when a key is in said non-depressed condition.

The above-mentioned and other objects and features of the invention will be more clearly understood from the following detailed description thereof when read in conjunction with the drawings in which;

DISCUSSION OF THE INVENTION

Figure 1:
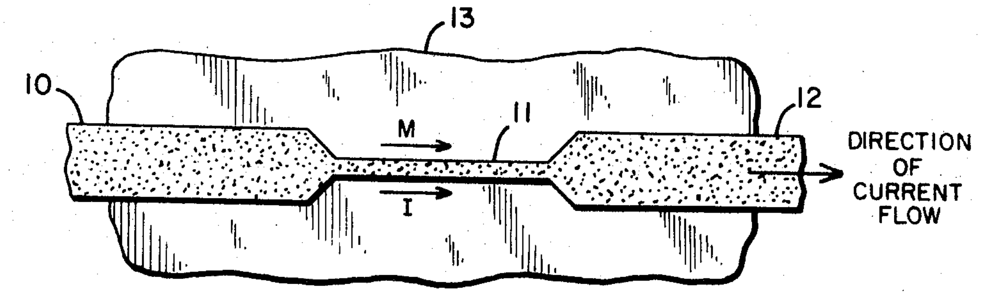
FIG. 1 shows the basic concept of a resistor formed from a magnetoresistive film.

The invention employs the property of magnetoresistivity whereby the resistance of the magnetoresistive material changes with both the magnitude of magnetization thereof and the direction of such magnetization with respect to the direction of the current through the magnetoresistive material. The magnetoresistive material can be, for example, a nickel-iron or nickel-iron-cobalt alloys, or, alternatively indium antimonide. The expression relating the direction of magnetization and the direction of current flow to change of resistance, $\Delta R$, is shown by the following expression:

$$\Delta R = (R_{max} - R_{min}) \cos^2\phi \qquad \text{(Exp. 1)}$$

In this expression $R_{max}$ and $R_{min}$ represent the extreme values of resistance caused by rotating a magnetic vector M within the plane of the film and $\phi$ represents the angle between the direction of current flow and the magnetic vector M. M can be rotated in the plane of the film through the use of an external magnetic field supplied, for example, by a small permanent magnet. The external magnet need have only sufficient strength to overcome the anistrophy field (the natural direction of the residual field) of the film element which is usually several oersteds.

The resistance of the film is in accordance with the following expression:

$$R = (R_{max} - R_{min}) \cos^2 \phi + R_{min} \qquad \text{(Exp. 2)}$$

If a relatively large change of resistance is desired, expressions 1 and 2 above show that the magnetization of the film should be rotated between $\phi = 0°$ and $\phi = \pm 90°$. Magnetic biasing of the resistor strip 11 in FIG. 1 can be accomplished during film deposition by providing for the anisotrophy field of the resistive element 11, that is the natural residual magnetic field respresented by the vector M, to lie parallel to the length of the film 11, and also to the direction of the current flow I through the resistor 11. Thus, in FIG. 1 vector M can be seen to be at $\phi = 0°$ due to the anistrophy field of strip 11 and requires no external biasing.

In FIG. 1 the resistor 11 is formed by the narrow strip of the magnetoresistive material. The wider strips 10 and 12 are interconnects and have a much smaller resistance due to their greater width.

Since expression 1 shows that a change of resistance in resistor 11 is related to the resistance value itself, it can be understood that a narrower resistor will produce a greater change of resistance when subjected to magnetic field normal thereto, than will a wide interconnect strip, such as strips 10 and 12.

Such characteristic permits the same material to be employed both for the interconnects 10 and 12 and also for the resistor elements such as element 11.

Figure 2:
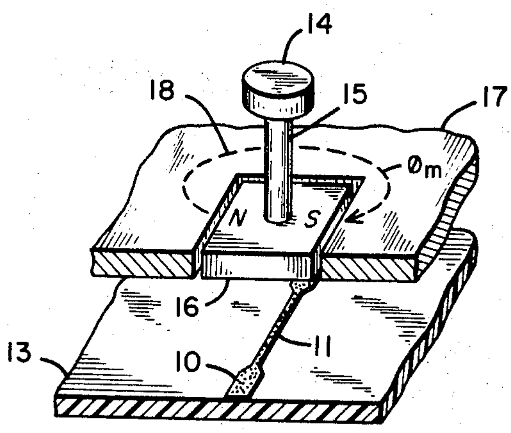
FIG. 2 is a perspective view of a single resistor of magnetoresistive material formed on a substrate and a magnet which can be lowered by depressing a key to pass its magnetic flux through said resistor and normal to the current flow therethrough.

Referring now to FIG. 2 there is shown a basic structure for establishing a magnetic field perpendicular to the resistor 11. In FIG. 2 a key 14 has a small permanent magnet 16 secured to the lower end thereof. The key 14 is shown in its normal, non-depressed condition wherein the small permanent magnet is positioned in the plane of a keeper magnet sheet 17, so that the magnetic flux $\phi_m$ from the magnet 16 passes through said keeper magnet 16 and cannot affect the resistivity of the resistor 11.

Figure 3:
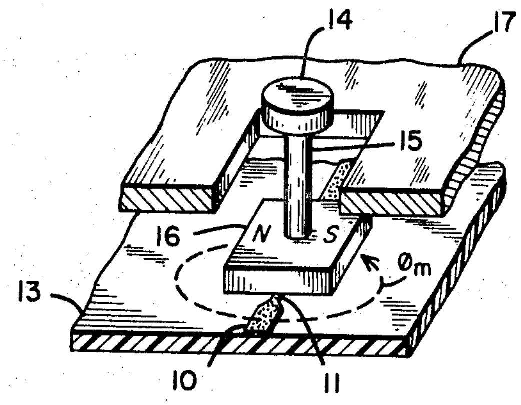
FIG. 3 shows the key in its depressed condition so that the magnet does, in fact, pass a magnetic field through said resistor normal to the current flow therethrough.

However, when the key 14 is depressed, as shown in FIG. 3, the small permanent magnet 16 is lowered below keeper plate 17 and into a position adjacent the resistor 11. The magnetic field $\phi_m$ generated by the permanent magnet 16 then passes through the resistor 11 and changes the value of said resistor in accordance with expression 1 above.

Figure 4:
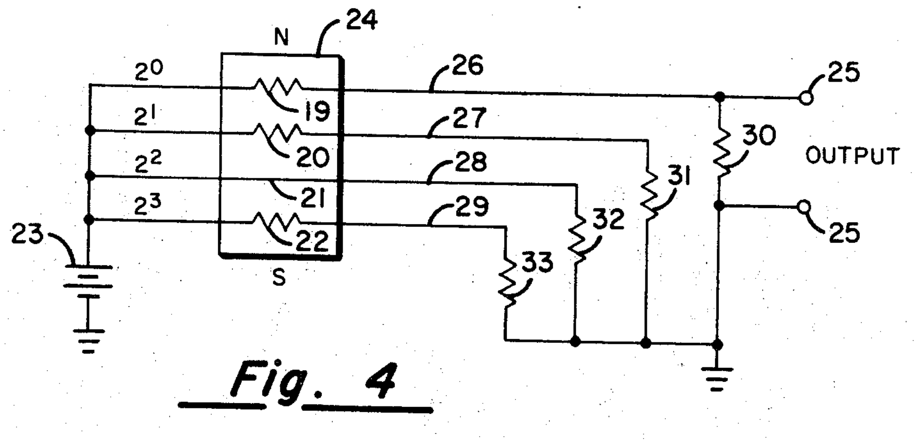
FIG. 4 is a schematic diagram of a plurality of resistors formed of said magnetoresistive material on a substrate, and which lie under a single magnet operable by a single key to produce a pattern of coded output signals when said magnet is lowered to pass its magnetic field therethrough.

In FIG. 4 a plurality of magnetoresistive strips 26, 27, 28 and 29 are positioned under a single magnet 30 which has a north pole N and a south pole S. More specifically, in FIG. 4 the portions of the magnetoresistive strips 26, 27, 28 and 29 under the magnet 30 are shown as resistors 19, 20, and 22 and short circuit element 21, all arranged in a vertical column. The resistive elements 19, 20 and 22 are formed by narrowed portions of magnetoresistive strips and the short circuit element 21 by a wider strip of magnetoresistive material. When the magnet 30 is lowered to be closely adjacent to the magnetoresistive strips 19, 20, 21 and 22, only the values of resistors 19, 20 and 22 will be changed appreciably thereby. The resistive value of short circuit element 21 remains virtually unchanged because of its very low initial resistance.

Individually associated with each of the strips 26, 27, 28 and 29 are load impedances 30, 31, 32 and 33. A common voltage source 23 is applied to a first terminal of each of the strips, thus effectively connecting the series combination of each strip and its associated output load resistance in parallel with every other strip and its associated load resistance.

In the structure of FIG. 4 the values of the resistors 19, 20 and 22 are changed when the magnet 24 is moved adjacent thereto so that a voltage pulse is generated across the load resistors 30, 31 and 33 associated with each of the strips 26, 27 and 29. More specifically, when the value of the resistor, such as resistor 19 is suddenly changed by virtue of the magnet 24 being moved adjacent thereto, the current through said resistor 19 will be changed to produce a current pulse which in turn will produce a voltage pulse across the output load resistor 30. Suitable sensing means, as will be discussed later, are connected across the load resistor 30 to sense and to amplify the small pulse produced by the change in resistance 19.

Since each of the strips 26 – 29 has a similar output load resistor and sensing means connected thereto, a four bit signal will be generated across the four load resistor 30 – 33 in parallel manner. Such coded output is then utilized for whatever purpose is desired.

The presence or absence of a resistor in the four magnetoresistive strips under magnet 30 represents the storage of a binary "1" or a binary "0". Thus in FIG. 4 the resistors 19, 20 and 22 represent binary 1's and the short circuit element 21 represents a binary 0. Accordingly, the binary word stored under magnet 30 of FIG. 4 is "1011" with resistor 19 representing the least significant bit 2°.

Figures 5, 6:
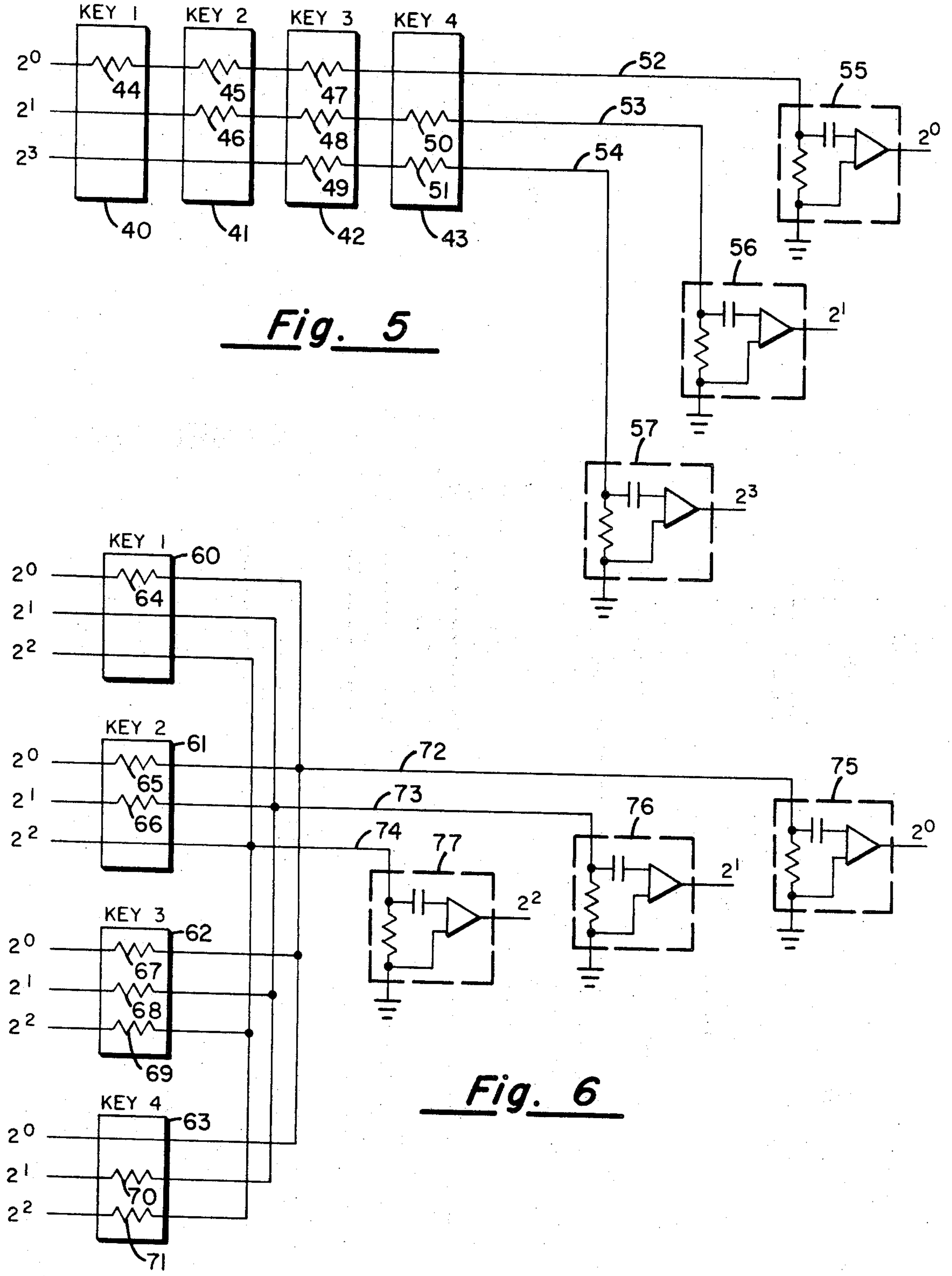
FIG. 5 shows a plurality of key positions of FIG. 4 with the resistors representing corresponding bit positions being connected in series arrangement.
FIG. 6 shows a plurality of the key positions of FIG. 4 with the resistors representing corresponding bit positions being connected in parallel arrangement.

In FIG. 5 there is shown an arrangement whereby a plurality of keys employ common sense amplifiers. More specifically, in FIG. 5 the resistors under each key representing the same bit positions are connected in a series arrangement and then sensed by a common sensing means. For example, the resistors 44, 45 or 47 under keys No. 1, No. 2 and No. 3 represent binary 1's in bit position $2^0$ and are connected in series arrangement. A signal generated in any of the three resistors 44, 45 and 47 is detected by the common sense amplifier 55. Since there is no resistive value under key 43, the bit position $2^0$ for key No. 4 contains a binary 0.

For the bit position $2^1$ the keys No. 2, No. 3 and No. 4 have resistors 49 and 51, respectively, thereunder. The resistors 49 and 51 are connected in series arrangement with common sense amplifier 57.

Referring now to FIG. 6 there is shown a form of the invention employing a column of keys all using common sensing means for detecting changes in resistors representing the same bit position.

More specifically, the resistors 64, 65 and 67 under the magnets 60, 61 and 62 respresent binary 1's in bit position $2^0$ and are all connected through the common lead 72 to the common sense amplifier 75. The $2^0$ bit position of key 63 is not a resistor and consequently represents a binary 0. The resistors 66, 68 and 70 under magnets 61, 62 and 63 represent binary 1's in the $2^1$ bit position and are connected in parallel to common sense amplifier 76 through common lead 73. The $2^1$ position under magnet 50 contains no resistor and consequently contains a binary 0.

Representing binary 1's in bit position $2^2$ are the resistors 69 and 71 under magnets 62 and 63. The resistors 69 and 71 are connected in parallel with respect to each other, with the signals generated therein being transported through common lead 74 to common sensor amplifier 77. There are no resistors under the magnets 60 and 61 in the $2^2$ bit position.

Figure 7:
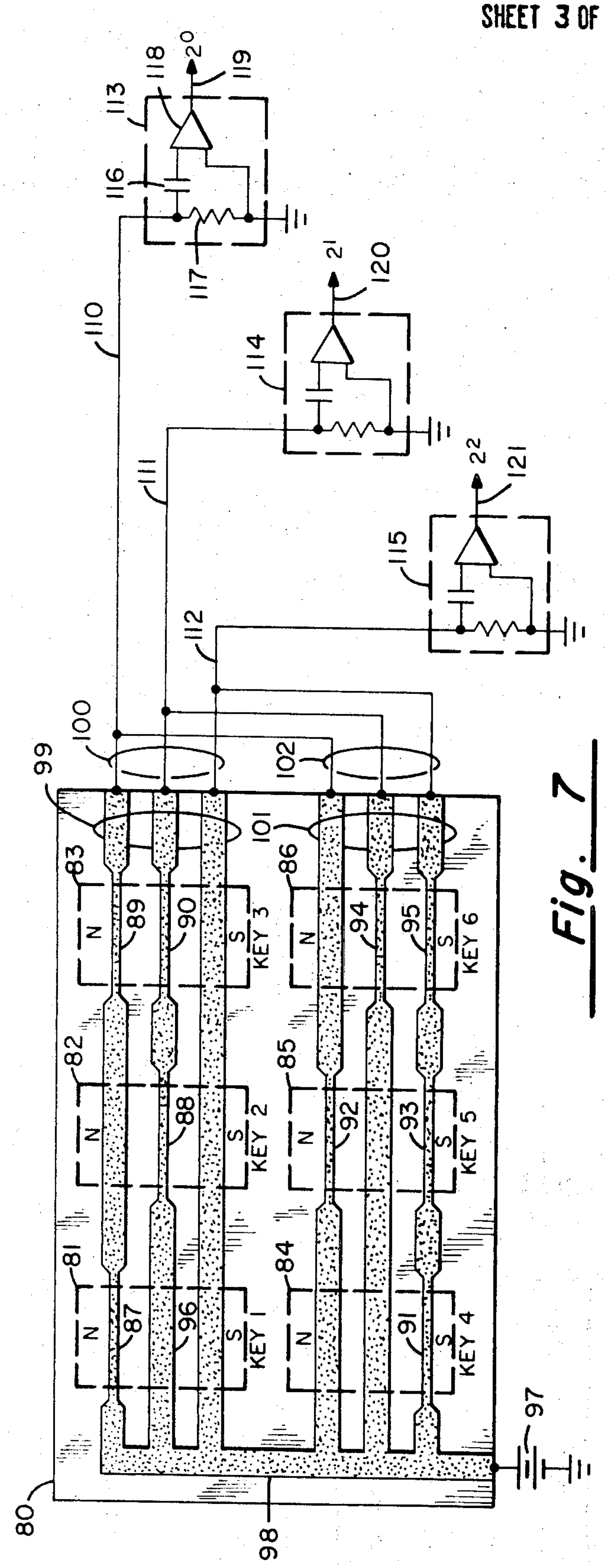
FIG. 7 shows a plurality of the key positions of FIG. 4 arranged in a matrix of rows and columns, with all of the resistors in each row that represent the same bit position being connected in series to a common output, and with the common points of each row of series-connected resistors that represents the same bit position, being connected in parallel arrangement to a common sensing means.

The diagram of FIGS. 5 and 6 show the resistive elements in conventional electrical representation. FIG. 7 shows such resistive elements as narrow strips of magnetoresistive film formed on a substrate. Further the diagram of FIG. 7 shows a matrix arrangement of key positions with resistors representing the same bit position being connected in series arrangement to form rows of such resistive elements, and with a plurality of such rows being connected in parallel arrangement with each other.

Furthermore, all the resistive elements representing the same bit position in all of the rows and in all of the columns are sensed by the same single common sense amplifier.

Thus, for example, a first row of keys is represented generally by magnets 81, 82 and 83. The narrowed portion 87 of the magnetoresistive film, which is formed on substrate 80, forms a resistive element positioned under magnet 85 in bit position $2^0$. Similarly, the narrowed portion 89 under magnet 83 forms a resistive element in bit position $2^0$ and can be seen to be connected in series arrangement with the narrowed portion 87. Changes in electric current through both of the resistive elements 87 and 89 are detected by a common sense amplifier 113 through common lead 110.

A second row of keys, represented generally by the magnets 84, 85 and 86, is connected in parallel with the first row of keys 81, 82 and 83 by means of a common bus 98 which is connected to a common battery source 97.

In the second row of keys there is only one resistive element shown in the $2^0$ bit position. Such resistive element is identified by reference character 92 and lies under magnet 85. Changes in the electric current through resistive element 92 are also supplied through common lead 110 to the common sense amplifier 113.

Similarly the resistive elements 88 and 90 lying under magnets 82 and 83 in the upper row of magnets are connected in series arrangement and supplied through common lead 111 to common sense amplifier 114. In the bottom row of magnets the resistive element 94, representing the $2^1$ bit position is also supplied through lead 111 to common sense amplifier 114.

There are no resistive elements representing the bit position $2^2$ in the upper row of magnets in FIG. 7 since the three key positions represented by magnets 31, 32 and 33 represent binary numbers having decimal equivalents of 1, 2 and 3, respectively. However, in the lower row each of the magnets 84, 85 and 86 have a resistive element 91, 93 and 95, respectively, lying thereunder. The three resistive elements 91, 93 and 95 are connected in series arrangement and supplied through lead 112 to the common sense amplifier 115.

Figure 8:
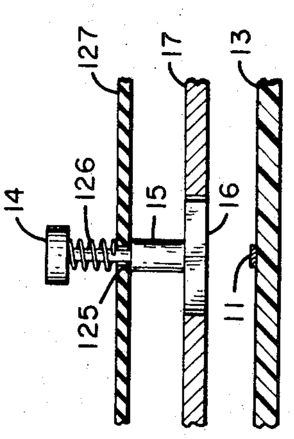
FIG. 8 shows a means for returning the key to its normal non-depressed condition.

In FIG. 8 there is shown a means for returning the key to its normal position after the operator has depressed and subsequently released said key. In FIG. 8 those elements which correspond to elements in FIGS. 2 and 3 are identified by the same reference character. The key 14 is shown in its non-depressed condition and is maintained in such position by the action of compression spring 126. The magnet 16 is shown lying in the plane of keeper magnet 17 and immediately above the magnetoresistive element 11 which is formed on the glass substrate 13. The shaft 15 of the key 14 has a shoulder 125 which limits the upward motion of key 14 by butting against the bottom surface of panel 127. When the key is depressed the spring 126 is compressed and the magnet 16 is lowered to a position very near the resistive element 11. The magnetic field generated by magnet 16 then flows through said resistive element 11 to vary the resistance thereof in the manner discussed hereinbefore.

Figure 9:
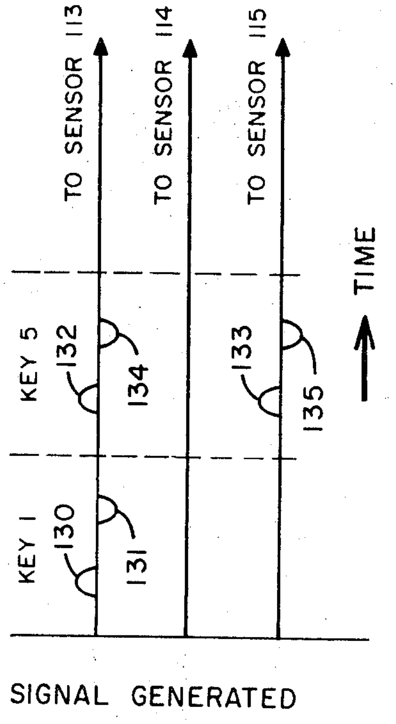
FIG. 9 shows typical output signals produced when magnets are lowered upon the resistors therebeneath.

Reference is now made in FIG. 9 which shows the type signal generated by the system of FIG. 7. More specifically, FIG. 9 shows the signals generated when key No. 1 and key No. 5 of FIG. 7 are depressed in consecutive order to lower the magnets 81 and 85 upon the pattern of thin film resistors lying below. When the magnet 81 is lowered the value of resistor 87 is changed, due to the rotation of the magnetic field therethrough, thereby generating the pluse 130. A short time later when key No. 1 is released and the magnet 81 is raised back into the plane of the keeper magnet, a second pluse 131 is generated as the magnetic field leaves the resistive element 85.

Subsequently, when key No. 5 is depressed to lower magnet 85 upon resistive elements 92 and 93, the pulses 132 and 133 are generated in said resistive elements 92 and 93, respectively. Then when key No. 5 is released and magnet 85 raised to remove the magnetic field from the resistors 92 and 93, the pulses 134 and 135 of FIG. 9 are generated.

It is to be understood that the forms of the invention shown and described herein are but preferred embodiments thereof and that various changes may be made therein without departing from the spirit or scope of the invention.

We claim:

1. A keyboard comprising:

a substrate;

a plurality of movable magnets arranged side-by-side in a row and positioned over said substrate;
means for moving said magnets into a first or a second position;
a first plurality of strips of magnetoresistive material formed on said substrate and extending under said row of magnets;
portions of selected strips lying under each magnet having a narrowed configuration to form an electrical resistance;
means for providing a biasing magnetic field in said narrowed portions along a first direction;
means for diverting the magnetic flux generated by each of said magnets from flowing through said strips of magnetoresistive material lying therebeneath when said each magnet is in said first position;
sensing means connected to each strip;
current source means for causing a current to flow through each strip and the sensing means connected thereto to detect a change in said current;
each of said magnets, when moved from said first position to said second position, having a spatial relation with the strips lying thereunder to cause the magnetic field generated therein to pass through said strips of magnetoresistive material lying therebelow in a direction normal to said biasing magnetic field to change the resistance of the strips having a narrowed configuration and thereby generate an electrical signal in the said narrowed strips.

2. A keyboard in accordance with claim 1 in which said means for diverting the magnetic flux generated by said movable magnets comprises:
magnetic path elements of a material having a low reluctance and positioned to provide a magnetic path for the magnetic flux generated by said movable magnets when said magnets are in their first position, to the exclusion of the magnetic paths through said magnetoresistive strips positioned underneath said movable magnets.

3. A keyboard in accordance with claim 1 in which said means for diverting the magnetic flux generated by said movable magnets comprises:
a magnetic keeper sheet which is positioned substantially parallel to said substrate and which is further positioned to provide a path for the magnetic flux of said movable magnets when in their first position, to the exclusion of magnetic paths through said magnetoresistive strips positioned under said movable magnets.

4. A keyboard comprising:
a substrate;
a plurality of groups of substantially parallel strips of magnetoresistive material formed on said substrate with each strip in each group of strips representing a specific bit position of a word and having a corresponding strip in every other group of strips;
means for biasing said strips with a magnetic field;
a plurality of movable magnets, each positioned over one of said groups of strips;
selected ones of the strips lying under each magnet having narrowed configurations to form resistances in accordance with a predetermined pattern to form a code;
means for selectively moving each of said magnets into either a first position or a second position;
means for diverting the magnetic flux of each magnet from flowing through the strips thereunder when in said first position;
each of said magnets, when in said second position, having a spatial relationship with the strips lying thereunder to establish a magnetic field having a vector direction which forms an angle greater than 45° with respect to the direction of the vector of said biasing magnetic field to change the resistance of any narrowed portion;
a common sensing means connected to corresponding strips of each group of strips and constructed to detect to the change of resistance of any narrowed portion thereof.

5. A keyboard in accordance with claim 4 in which said means for diverting the magnetic flux generated by said movable magnets comprises:
magnetic path elements of a material having a low reluctance and positioned to provide a magnetic path for the magnetic flux generated by each of said movable magnets when said movable magnets are in their first position, to the exclusion of magnetic paths through the magnetoresistive strips positioned underneath said magnets.

6. A keyboard in accordance with claim 4 in which said means for diverting the magnetic flux generated by said magnets comprises:
a magnetic keeper sheet which is positioned to substantially parallel to said substrate and which is further positioned to provide a path for the magnetic flux of said movable magnets when in their first position, to the exclusion of magnetic paths through said magnetoresistive strips positioned under said movable magnets.

7. A keyboard comprising:
a substrate;
a plurality of key positions positioned over the surface of said substrate, with each key position comprising;
a movable magnet positioned above said substrate surface;
a plurality of strips of magnetoresistive magerial formed upon said substrate surface underneath said magnet and with preselected ones of said strips having a narrowed configuration to form a resistance;
menas for providing a biasing magnetic field in said strips;
means for selectively moving said magnet into a first position wherein the magnetic field therefrom does not flow through said strips of magnetoresistive material and into a second position wherein said magnetic field does flow through said strips in a direction normal to said biasing magnetic field;
each strip of each plurality of strips under each magnet representing a predetermined bit position of a coded word generated when a magnet is moved from its first position to its second position;
means for passing a current flow through each strip;
a common sensing means connected to sense a change in current flow through any strip under any magnet, which represents the same bit in each of said words.

8. A keyboard in accordance with claim 7 comprising:
magnetic path elements of a material having a low reluctance and positioned to provide a magnetic path for the magnetic flux generated by each of said movable magnets when said magnets are in their first position, to the exclusion of magnetic paths through said magnetoresistive strips positioned underneath said movable magnets.

9. A keyboard in accordance with claim 7 comprising:

a magnetic keeper sheet which is positioned substantially parallel to said substrate surface and which is further positioned to provide a magnetic path for the magnetic flux of said movable magnets when in their first position, to the exclusion of a magnetic path through said magnetoresistive strips positioned under said movable magnets.

* * * * *